(12) United States Patent
Tabanelli

(10) Patent No.: US 11,104,040 B2
(45) Date of Patent: Aug. 31, 2021

(54) APPARATUS AND METHOD FOR HEATING PIPES MADE OF THERMOPLASTIC MATERIAL

(71) Applicant: SICA S.p.A., Alfonsine (IT)

(72) Inventor: Giorgio Tabanelli, Cotignola (IT)

(73) Assignee: SICA S.P.A., Alfonsine (IT)

( * ) Notice: Subject to any disclaimer, the term of this patent is extended or adjusted under 35 U.S.C. 154(b) by 0 days.

(21) Appl. No.: 16/601,158

(22) Filed: Oct. 14, 2019

(65) Prior Publication Data
US 2020/0039113 A1 Feb. 6, 2020

Related U.S. Application Data

(62) Division of application No. 15/305,289, filed as application No. PCT/IB2015/052693 on Apr. 14, 2015, now Pat. No. 10,478,997.

(30) Foreign Application Priority Data

Apr. 22, 2014 (IT) .......................... BO2014A000228

(51) Int. Cl.
*B29B 13/02* (2006.01)
*B29C 57/02* (2006.01)
*B29B 13/08* (2006.01)
*B29C 35/08* (2006.01)
*B29L 23/00* (2006.01)

(52) U.S. Cl.
CPC ............ *B29B 13/025* (2013.01); *B29B 13/08* (2013.01); *B29C 57/02* (2013.01); *B29C 2035/0822* (2013.01); *B29L 2023/22* (2013.01)

(58) Field of Classification Search
CPC .............................. B29B 13/025; B29B 13/08
See application file for complete search history.

(56) References Cited

U.S. PATENT DOCUMENTS

| 4,113,813 A | 9/1978 | Wilson |
| 2011/0229112 A1 | 9/2011 | Taniguchi et al. |

FOREIGN PATENT DOCUMENTS

| DE | 10058505 A1 | 6/2002 |
| EP | 0700771 A1 | 3/1996 |
| IT | 1171936 | 6/1987 |
| JP | H02121828 A | 5/1990 |
| WO | WO9942279 A1 | 8/1999 |

OTHER PUBLICATIONS

International Search Report and Written Opinion dated Oct. 21, 2015 for counterpart PCT Application No. PCT/IB2015/052693.

*Primary Examiner* — Nathan T Leong
(74) *Attorney, Agent, or Firm* — Timothy J. Klima; Shuttleworth & Ingersoll, PLC

(57) ABSTRACT

Described is an apparatus for heating end portions of pipes made of thermoplastic material, comprising an internal heating element, designed to be inserted at least partially inside an end portion of a pipe made of thermoplastic material for heating an inner cylindrical surface of the portion, the heating element comprising at least one infrared ray radiation unit which has an operating zone designed to face at least partially the inner cylindrical surface, the operating zone extending longitudinally along a predetermined direction, parallel to a central axis of the pipe to be heated.

1 Claim, 4 Drawing Sheets

APPARATUS AND METHOD FOR HEATING PIPES MADE OF THERMOPLASTIC MATERIAL

This application is divisional application of U.S. application Ser. No. 15/305,289 filed Oct. 19, 2016 which is a National Phase of International Application PCT/IB2015/052693 filed Apr. 14, 2015.

This application claims priority to Italian Patent Application No. BO2014A000228 filed Apr. 22, 2014. All of the applications in their entirety are incorporated by reference herein.

TECHNICAL FIELD

This invention relates to an apparatus for heating pipes made of thermoplastic material.

This invention also relates to a heating method.

More specifically, this invention relates to an apparatus for heating ends of pipes made of thermoplastic material to subject the ends to a subsequent hot plastic deformation process.

The apparatus is especially suitable for performing the step of heating the end of the pipe in the belling process.

BACKGROUND ART

In effect, in the production of pipes by thermoplastic extrusion designed for making conduits for delivering and/or discharging fluids (used for example in the drainage networks, drinking water distribution networks and sewers of building works), the belling machines are used for forming an end portion of the pipes into the characteristic "bell" shape. This particular wider shape is used to connect the pipes in succession which form a conduit. An unshaped end of a pipe is normally inserted in the bell-shaped end of the adjacent pipe in the conduit.

The belling machine is normally installed along the extrusion line where it receives the cut pipes to be processed.

The majority of belling machines make the bell with the hot forming process. The belling machines are equipped with at least one oven which heats the end of the pipe, changing the wall of the end of the pipe to be shaped into a plastically deformable softened state. The machine is further equipped with forming equipment which, by using a suitable mould, forms the heated end of the pipe into a bell shape. The bell shaped on the mould is generally cooled inside the same forming equipment.

The most commonly used thermoplastic materials in pipe systems are unplasticised polyvinyl chloride (PVC-U), polypropylene (PP) and high-density polyethylene (HDPE).

The state of optimum plastic deformability and therefore the final thermal state of the pipe before the belling process depends on the material, the shape of the bell, the wall thickness of the pipe, the dimensions specified for the bell and the characteristics of the forming and/or cooling method.

The PVC-U thermoplastic material is a substantially amorphous material which at ambient temperature exhibits a fragile mechanical behaviour similar to glass whilst at temperatures greater than 75° C.-80° C. (vitreous transition temperature Tg) it starts to soften, exhibiting a plastic rubbery behaviour. Normally, with the PVC-U pipe the belling step allows a relatively large optimum thermal heat state range.

If therefore, the optimum temperatures for a belling process of the PVC-U pipe are approximately between 90° C. and 125° C., the same cannot be said for the other above-mentioned materials, polypropylene (PP) and high-density polyethylene (HDPE).

Polypropylene (PP) and high-density polyethylene (HDPE) at ambient temperature are, in effect, semi-crystalline, that is to say, there coexists in them an ordered macromolecular crystalline configuration and a disordered amorphous macromolecular configuration.

At ambient temperature the amorphous part is in a viscous liquid state, so the ambient temperature is greater than the vitreous transition temperature of the amorphous part of the material.

At ambient temperature, PP and HDPE exhibit a ductile and tough mechanical behaviour.

Unlike PVC-U, both PP and HDPE have a melting temperature, that is to say, a temperature above which there is a destruction of the crystalline mesh and the change of state from solid to liquid. The melting temperature of polypropylene (PP) is approximately 165° C., whilst that of high-density polyethylene (HDPE) is approximately 134° C.

The change from the solid state to the liquid state is therefore quite sudden and occurs in a very small temperature range equal to approximately ±1° C. relative to the melting temperature.

At temperatures higher than melting temperature the process of forming the bell in the hot state cannot be performed. For this reason, the optimum thermal state for the belling of PP and HDPE pipes is certainly less than the melting temperature.

Consequently, the shaping of the bell in PP and HDPE pipes occurs with material which exhibits a viscoelastic and viscoplastic mechanical behaviour, so, unlike PVC-U pipes, the elastic behaviour of the material in the mechanical shaping deformation is not negligible. With temperatures which are too low the plastic deformability of the material can be insufficient to form the shape of the bell, or, even if it can be formed, the resulting bell is subject to shrinkage phenomena due to the memory of the initial dimensions of the pipe, the shrinkage effects increasing the greater is the elastic part of the deformation made during the forming step.

For this reason, in the belling process for PP and HDPE pipes, variations are permitted in the hot working temperature which fall within a very small range, approximately ±2° C. around the predetermined optimum value.

Therefore, compared with PVC-U pipes, the most common belling processes applied to PP and HDPE pipes require a temperature distribution along the axis of the pipe and in the thickness of the wall which is almost uniform, as with different temperatures in various zones of the pipe there would be a different behaviour with the shrinkage of the various zones of the bell and, as a direct consequence, an unacceptable distortion in shape and a dimensional instability of the bell itself.

In order to limit at least partly the occurrence of these unwanted circumstances, contact heating ovens are widely applied in the belling machines for PP and HDPE pipes. The contact ovens are substantially configured with metallic masses which adhere to the surface of the end of the pipe. The metallic masses are maintained at a precise temperature and transfer the heat to the wall of the pipe by conduction. Normally, the contact oven is configured with shells which enclose the outside of the wall of the pipe. A spindle which heats by contact or a device which operates with a different heat transmission system is inserted inside the pipe in the same oven.

Whilst it is relatively simple to heat the outer surface of the pipe, it is much more complex to achieve a heating by contact of the inner surface. In effect, due to the features of the pipe extrusion process, the wall thickness and, therefore, the inside diameter of the pipe is never as regular as the outside diameter; it follows that the internal heating element can if anything be close the inner wall, but not adhere to the surface. Moreover, the reduced space available inside the small diameter pipes (the commercial diameters currently start from 32 mm) makes it complex and costly to make an efficient internal heating system.

For these reasons it is normally preferred to heat the pipe mainly by external contact, adopting solutions for the internal heating that make the heating process faster and such as not create thermal discontinuities in the wall of the pipe.

For example, the internal heating is performed with systems which mainly heat by radiation with the use of measures, typically rotary devices, such as to render the heating uniform in the circumference of the pipe.

The heating which occurs mainly by external contact, with transmission of heat by conduction, is in any case a slow heating process.

In the belling machines for PP and HDPE pipes such as those described in patent documents IT 1 171 936 and EP 700 771, the time necessary for forming and cooling the bell are considerably shorter than the times required for heating the end of the pipe prior to shaping.

Purely by way of example, to form the bell in a common PP pipe for drains of buildings (outside diameter 110 mm, wall thickness 2.7 mm) a forming-cooling time of approximately 15 seconds is required, whilst the heating with contact systems makes the pipe formable in a time of not less than 45 seconds.

For this reason, the prior art belling machines for PP and HDPE pipes are normally configured with a single forming-cooling station associated with a plurality of heating stations.

Therefore, the cut pipe coming from the extrusion line is heated, at the end to be formed into a bell shape, in the various heating stations, before being inserted in the single forming and cooling station.

The need to produce short pipes and at the same time maintain high extrusion speeds results in the need for high production belling machines; for this reason the systems for belling drain pipes for buildings are suitably configured to operate in a multi-belling mode.

It has been seen that a precise heating is not required for PVC-U pipes, unlike for PP and HDPE pipes and, therefore, hot air ovens or ovens with radiation heating elements can be conveniently used which are able to heat in an optimum manner, the PVC-U pipes, in much shorter times than that which can be achieved with contact ovens.

For example, belling machines for PVC-U pipes configured with a single heating station equipped with a hot air oven, even in multi-belling mode, are able to support the same productivity as belling machines configured with three or four contact stations. The hot air or radiation ovens are also usually less complex and expensive than contact ovens for multi-belling. In effect, these belling machines configured with radiation or hot air ovens can only be used for PVC-U pipes, where, on the contrary, the greatest demand for drain pipes for buildings is currently for PP and HDPE pipes.

To overcome these limitations, at least partly, "hybrid" machines are made where the first heating station is of the hot air or radiation type, whilst the second and last station is of the contact type. In this way, a fast, but imprecise, pre-heating is achieved with the first station, whilst the second and last contact station completes the heating bringing the end of the pipe to the precise and uniform heating necessary for PP and HDPE pipes.

Amongst the radiant ovens used in belling machines, the so-called short wave radiant ovens are important, such as that described in patent document DE10058505, as it makes it possible to obtain reduced, and therefore advantageous, heating times. This device basically comprises a container limited by metallic walls open at the side where the end of the pipe to be heated enters. The inside of the container houses several electrically powered heating elements.

The apparatus is equipped with heating elements, so-called radiation units, which transfer electromagnetic energy in the form of infra-red rays, the radiation emitted mainly in the short wave range (0.9 µm-1.6 µm). Compared with the more common long and medium wave radiation units, used in the belling machines for PVC-U pipes, the short wave radiation units have a greater penetration capacity.

The short wave radiation units, commonly known also as infra-red lamps, are rectilinear tubes made of quartz glass, inside of which a tungsten wire is located which reaches temperatures in the order of 2000° C. These lamps have very short starting times, of less than 2 seconds, a feature which makes it possible to keep the radiation units de-energised during the phases in which the pipe is not present in the oven, with obvious energy savings.

In the short wave radiation ovens a certain number of lamps are positioned parallel to the axis of the pipe.

Since the distribution of the radiation is not uniform around the pipe in the oven, the pipe is maintained in constant rotation during the heating step in order to obtain a uniform heating along the circumference.

With a focussed positioning and selection of the radiation units, in terms of number and power, it is possible to obtain very short heating times providing the radiation units are installed both outside and inside the pipe.

The two-sided heating is also necessary to obtain the maximum uniformity of temperature in the thickness of the wall.

However, in the belling of PP and HDPE pipes a uniform heating is also necessary along the axis of the pipe and the configuration of the oven described above does not favour this type of heating. In effect, given the laws of the transmission of heat by radiation, a pipe exposed to a radiation unit positioned parallel to its axis is heated more in the zone which faces the central part of the emitter, since this pipe zone is overall closest to the heating system; with the heating reducing in the zones of the pipe which face the ends of the heating element. This problem can be solved, at least for the outer side of the pipe, by preparing the oven with at least two groups of lamps suitably offset along the direction of the axis of the pipe. This arrangement, together with the use of suitable metallic screens close to the access opening of the oven, allows the creation, by superposition of the effects, of a substantially uniform heating area.

However, it is difficult to adopt a similar solution to make the heating of the inner side of the pipe uniform, also because, especially inside small diameter pipes, there is no space available to insert two groups of lamps, of suitable power, conveniently offset parallel to the axis of the pipe.

DISCLOSURE OF THE INVENTION

The aim of this invention is therefore to overcome the drawbacks of the prior art by providing an apparatus for heating pipes which is able to heat the pipe in a uniform manner.

Another aim of this invention is to provide an apparatus for heating pipes which is, at the same time, energy efficient, inexpensive to make and practical to use.

A further aim of this invention is to provide a method for heating portions of ends of pipes made of thermoplastic material which heats the portions uniformly.

According to the invention, these aims are achieved by an apparatus for heating pipes comprising the technical features described in one or more of the appended claims.

BRIEF DESCRIPTION OF DRAWINGS

The technical features of the invention, with reference to the above aims, are clearly described in the claims below and its advantages are more apparent from the detailed description which follows, with reference to the accompanying drawings which illustrate a preferred, no-limiting example embodiment of it, and in which:

DETAILED DESCRIPTION OF PREFERRED EMBODIMENTS OF THE INVENTION

Figure 1:
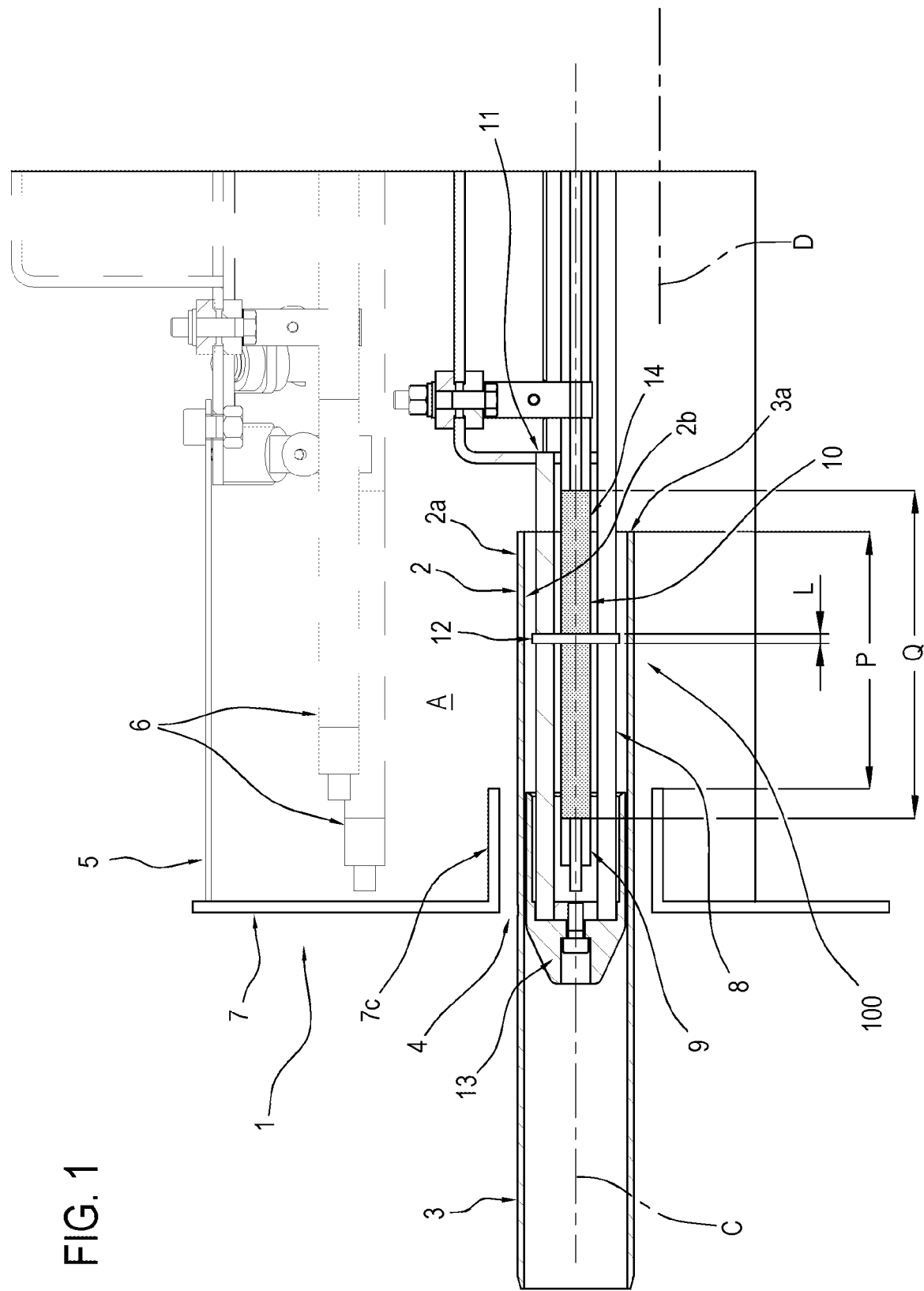
FIG. 1 is a schematic lateral elevation view, with some parts cut in cross section to better illustrate others, of a heating apparatus made according to this invention.

As illustrated in FIG. 1, the numeral 1 denotes in its entirety a preferred embodiment of the heating apparatus according to this invention.

The apparatus 1 is designed to carry out, with the method described below, the heating of end portions 2 of pipes 3 made of thermoplastic material, introduced through an access opening 4.

Mainly, but not necessarily, the apparatus 1 according to this invention is used for heating pipes 3 made of polypropylene (PP) and made of high-density polyethylene (HDPE).

The end portion 2 of the pipe 3 is heated for being subjected to a thermoforming step, such as the forming of an end bell, not illustrated.

As shown in the accompanying drawings, the apparatus 1 comprises a containment casing 5 inside of which is defined an area A for heating an end portion 2 of the pipe 3.

Inside the area A there are a plurality of heating elements 6 designed to operate by radiation on an outer cylindrical surface 2a of the portion 2 of the pipe 3, also indicated as external heating elements.

The casing 5 comprises a front wall which, near the access opening 4 of the apparatus 1, has a cylindrical portion 7c projecting inwards, that is, towards the above-mentioned heating area A.

The cylindrical portion 7c of the wall 7 comprises a protective screen to prevent the heating of the pipe 3—by the external heating elements 6—outside the desired end portion 2.

In other words, the portion of the pipe 3 which protrudes from the cylindrical portion 7c towards the heating area A constitutes, with the relative length P, precisely the end portion 2 to be heated.

The apparatus 1 also comprises an internal heating element 8 on which is fitted, externally, the pipe 3, at least for a stretch equal to the above-mentioned end portion 2 to be heated.

The internal heating element 8 is designed to heat an inner cylindrical surface 2b of the end portion 2 and, for this purpose, comprises one or more infra-red ray radiation units 9.

Figure 2:
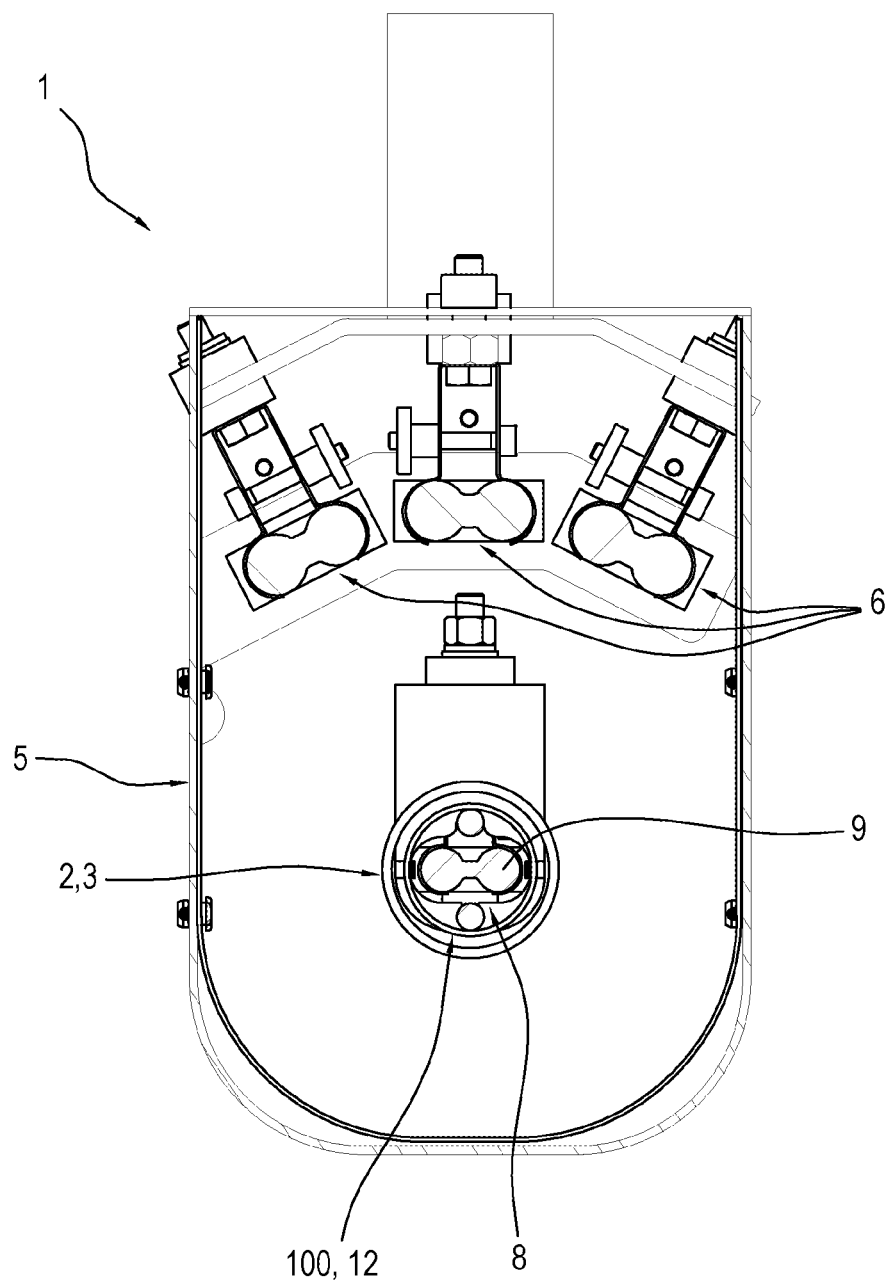
FIG. 2 is a schematic front elevation view, with some parts cut away and others in cross section, of the apparatus of FIG. 1.

The embodiment of the internal heating element 8 shown in FIGS. 1 and 2 has a single radiation unit 9.

The infra-red ray radiation unit 9 is advantageously of the filament type and has an operating zone 10 extending longitudinally along a predetermined direction D for a respective length Q and facing the above-mentioned inner cylindrical surface 2b of the end portion 2.

When the end portion 2 is fitted on the internal heating element 8, the above-mentioned predetermined direction D is parallel to a central axis C of the pipe 3 to be heated.

With reference to FIG. 1, the internal heating element 8 comprises a frame 11 for supporting the radiation unit 9, the frame 11 extending longitudinally along the above-mentioned predetermined direction D.

The internal heating element 8 also comprises, also supported by the frame 11, a first screening element 12 having an annular extension around the radiation unit 9.

The first screening element is designed to neutralise at least partially the infra-red rays emitted by a portion of the operating zone 10 of the radiation unit 9.

The first screening element 12, hereinafter also referred to as the annular screening element, is advantageously made in the form of a thin metal plate.

The first screening element 12 is located in an intermediate position relative to the longitudinal extension of the radiation unit 9.

Preferably, the first screening element 12 is located in an intermediate position along the longitudinal extension of the above-mentioned operating zone 10 of the radiation unit 9.

Advantageously, the internal heating element 8 also comprises, supported by the frame 11, means, not illustrated, for adjusting the relative position of the annular screening element 12 with respect to the radiation unit 9 along the above-mentioned direction D.

The above-mentioned and not illustrated adjustment means therefore allow the position of the annular screening element 12 to be varied along the direction D.

The above-mentioned and not illustrated adjustment means are advantageously of the lead nut and screw type, for a fine adjustment of the position. Alternatively, or in addition, to the lead nut and screw type coupling, the above-mentioned and not illustrated adjustment means comprise a slidable coupling, made between the annular screening element 12 and a rectilinear guide extending parallel to the direction D and supported by the frame 11.

As illustrated in FIG. 1, the frame 11 supports a second screening element 13 positioned at a longitudinal end of the frame 11 projecting inside the pipe 3.

The second screening element 13 is designed to shield the pipe 3 from the infra-red rays directed towards parts of the pipe different from the portion 2 to be heated.

The second screening element 13 therefore has a substantially axially symmetrical shape.

According to the embodiment shown in FIG. 1, the second screening element 13 has, towards the inside of the apparatus 1, a cylindrical extension adjacent to the surface of the pipe 3 with a cavity which surrounds the end part of the radiation unit 9 and, towards the outside, a truncated cone shape designed to facilitate the insertion of the pipe 3 on the internal heating element 8.

Figure 3:
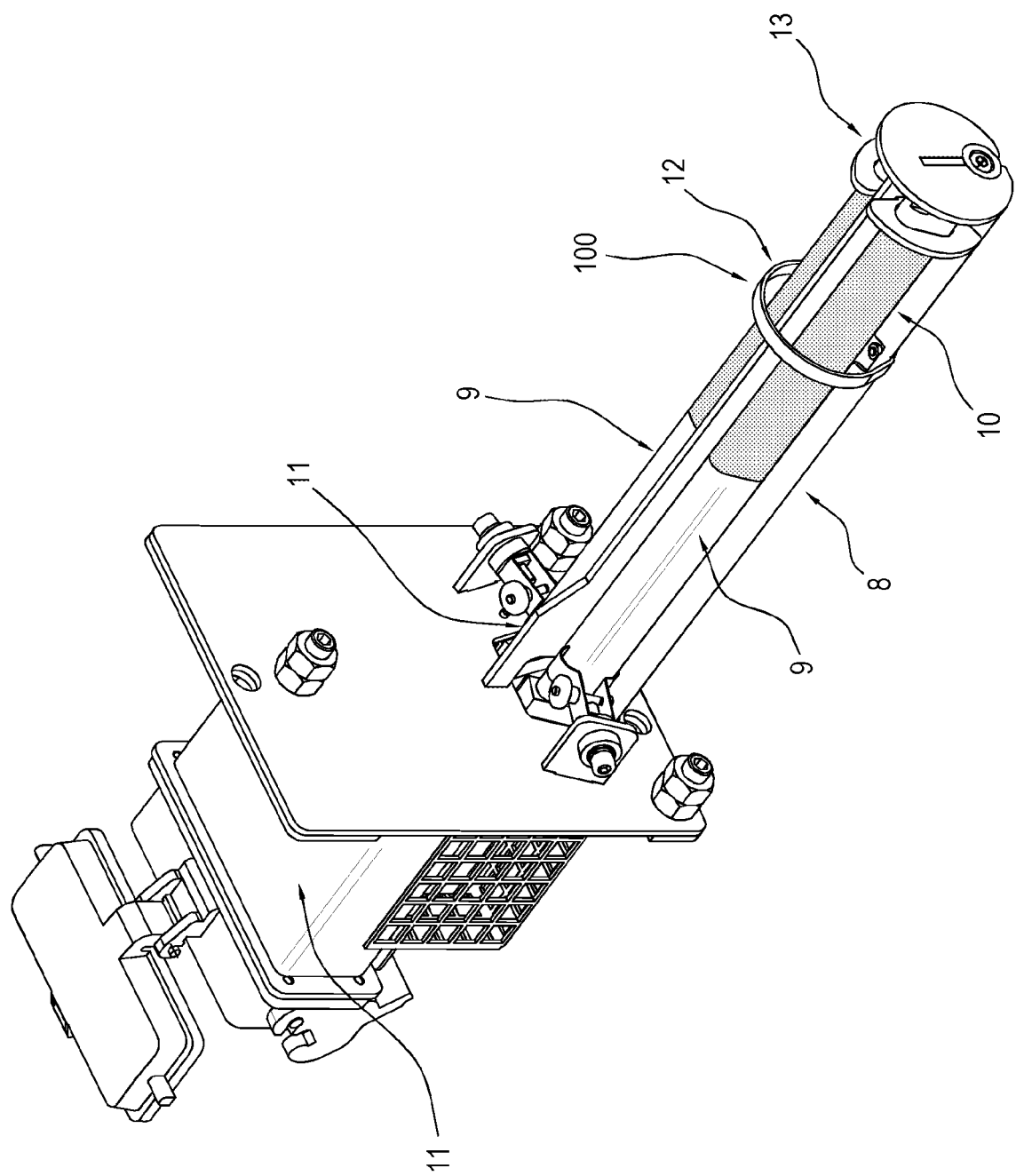
FIG. 3 shows a schematic perspective view of a detail of a variant of the apparatus of the preceding figures.

According to the embodiment shown in FIG. 3, the shape towards the outside of the second screening element 13 is disc-like.

The apparatus 1 also comprises rotation means, not illustrated and of a substantially known type, for rotating the pipe 3 with the respective end portion fitted on the internal heating element 8, relative to the radiation unit 9, about the central axis C of the pipe 3.

The purpose of this rotation is to render uniform in a circumferential direction the heating of both the inner 2b and outer 2a surfaces of the end portion 2 of the pipe 3 operated by the internal 8 and external 6 heating elements, respectively.

The embodiment of the internal heating element 8 shown in FIG. 3 has, unlike that of FIGS. 1 and 2, two radiation units 9, positioned with the respective filaments parallel to each other and to the direction D, preferably, but not necessarily, without longitudinal offsetting along the direction D.

The annular screening element 12 defines, for the heating apparatus 1, means 100 for conditioning the infra-red rays emitted by the radiation unit 9, the conditioning means 100 being designed to limit, in an intermediate position along the longitudinal extension of the operating zone 10 of the unit 9, the action for heating the end portion 2 of the pipe 3.

According to variant embodiments not illustrated, but falling within the scope of this invention, the conditioning means 100 are defined, in a filament radiation unit 9, by discontinuities in the extension of the filament.

In practice, these discontinuities can consist in a reduced winding of the filament, such as to reduce the energy emitted per unit length, or by an actual absence of filament for a predetermined section of the longitudinal extension of the operating zone 10 of the radiation unit 9.

The longitudinal extension of this section of discontinuity is comparable and similar to the length L indicated above with reference to the annular screening element 12.

In other words, in the case, not illustrated, of eliminating or reducing a longitudinal section of radiating filament of the unit 9, the optimum length of this section can be compared with the optimum length L of the annular screening element 12.

In use, as illustrated in FIG. 1, with methods and apparatus known and not illustrated nor described further, the end portion 2 of a pipe 3 made of thermoplastic material to be heated is fitted on the internal heating element 8.

Whilst the outer cylindrical surface 2a of the portion 2 is heated by the action of the external heating elements 6, the inner cylindrical surface 2b is struck by rays emitted by the radiation unit 9 of the internal heating element 8.

At the same time, the above-mentioned and not illustrated rotation means are activated to rotate the pipe 3 about the relative central axis C.

The operating zone 10 of the radiation unit 9 faces the end portion 2 of the pipe 3 to be heated.

It has been experimentally seen that it is advantageous to extend the operating zone 10, even in a limited manner, beyond the end edge 3a of the pipe 3, for a section 14, as shown in FIG. 1.

With this arrangement of the radiation unit 9, the part of the pipe 3 subjected to greater heating would without doubt be that facing the central part of the above-mentioned operating zone 10.

It has been seen experimentally that in order to achieve an almost uniform heating along the direction of the axis C of the pipe 3, the radiating filament can be configured with a non-uniform power density, that is, suitably reducing the power density at the above-mentioned part of the pipe 3 subjected to greater heating.

Similarly, the elimination of a small portion of radiating part (in practice, the radiating filament) at the central zone subjected to greater heating has been found to be particularly effective.

For this purpose, that is, the creation of a discontinuity in a longitudinal direction in the emission of radiating power, the first screening element 12 is positioned around the radiation unit 9.

The first screening element 12 therefore has a substantially continuous annular surface S extending longitudinally along the direction D for a predetermined length L.

This length L is determined experimentally as a function of certain parameters, including the diameter of the pipe 3 to be heated, the heating capacity of the radiation unit 9 (or units, if there is more than one, as in the embodiment shown in FIG. 3).

Advantageously, in the processing of the pipes 3 most commonly used, the length L is between 1 and 15 mm.

Preferably, the length L is between 2.5 and 9 mm.

It has been seen experimentally that values of the length L greater than those indicated can adversely affect the correct operation of the radiation unit 9, until causing the failure by overheating due to the reflective effect of the annular screening element 12.

Figure 4:
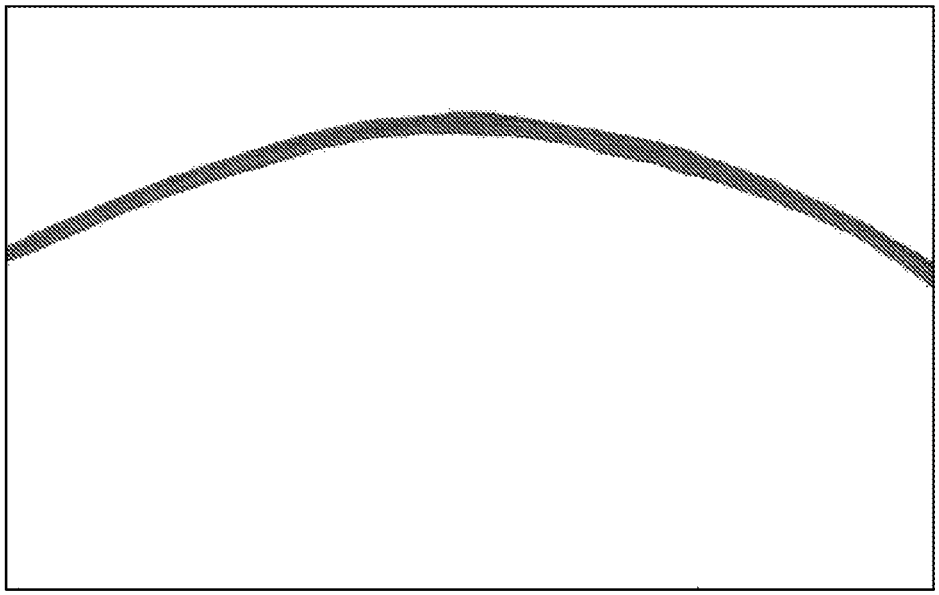
FIGS. 4 and 5 show two diagrams.
Figure 5:
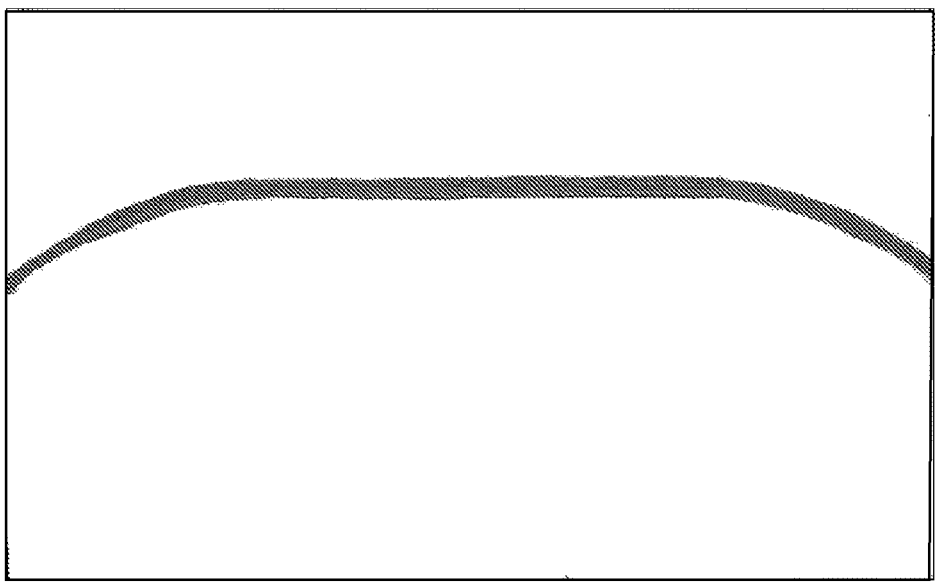

The diagrams of FIGS. 4 and 5 indicate how it has been experimentally possible to observe the distribution of heating energy which strikes a portion 2 of pipe 3 facing an infra-red ray radiation unit 9.

More specifically, FIG. 4 represents a diagram showing the energy per unit of surface area relative to a pipe exposed to the radiation of a normal radiation unit 9 (for example, of the filament type normally used in the filed of processing pipes made of thermoplastic material) as a function of the longitudinal extension of the radiation unit (in the axis of abscissas).

FIG. 5 shows instead, in a respective diagram, the energy per unit of surface area relative to the same pipe exposed to the radiation of the radiation unit 9 with the latter equipped with an annular screening element 12 made according to this invention. Also in this diagram, the energy value (axis of ordinate) is represented as a function of the longitudinal extension of the radiation unit (in the axis of abscissas).

The experimental tests performed, the results of which are shown below in a qualitative form, have been carried out with pipes having nominal diameters of 32 mm, 40 mm and 50 mm, (and relative zone to be heated which extends axially for approximately 70 mm) using as the radiation unit an infra-red emission lamp having a power density of 60 W/cm.

It has been seen experimentally that the optimum uniform distribution of heating energy is obtained, with the characteristics listed above, with an annular screening element 12 extending axially with length L of just less than 3 mm.

In short, the adoption of the annular screening element 12, even though it has a very limited extension (in the case described L is less than 3 mm), it has nevertheless allowed the heating energy distribution along the end portion 2 of the pipe 3 to be kept uniform in a particularly effective manner, as can be seen in the diagram of FIG. 5.

For pipes 3 which are larger, for example with nominal diameters of 63 mm or 75 mm, the bell of which requires an end portion 2 to be heated of approximately 75 mm, with a radiation unit comprising an infra-red lamp having a power density of 80 W/cm, the optimum length L of the annular screening element 12 is approximately 5 mm.

For pipes 3 which are even larger, such as those with diameters of 90 mm, 110 mm, 125 mm and 160 mm, the bell of which requires an end portion 2 to be heated extending for approximately 85-100 mm, and an internal heating element 8 comprising two radiation units 9 (lamps with power density of 60 W/cm) the optimum length L of the annular screening element 12 is approximately 9 mm.

These experimental results have also shown that the adoption of the annular screening element 12 results in an overall reduction in the radiating power of the radiation units 9 which is negligible.

Therefore, the adoption of the annular screening element 12, as well as being absolutely effective in achieving a uniform longitudinal heating of the inner cylindrical surface 2b of the end portion 2 of the pipe 3, does not penalise the heating times.

The apparatus 1 according to this invention has major advantages.

A first of these advantages is that of allowing, making uniform the heating effect, the use of short wave radiation units, thus fully exploiting the speed of heating.

A further advantage is the possibility of effectively adapting the heating apparatus to different needs linked with the processing of pipes even with different dimensions.

Moreover, the apparatus 1 according to this invention is suitable for being used, due to the fast heating times which can be achieved, to make belling machines even with a single heating station. In these belling machines, the pipes are transferred to the belling and cooling station at the end of the step for heating in the single oven.

Alternative embodiments of this invention, which are partially equivalent even if less efficient, comprise the making of radiation units with non-uniform power densities, that is to say, wherein a central part has a reduced capacity of emission of infra-red rays. This reduced capacity is achieved, for example, as mentioned, by reducing or eliminating radiating filament for a predetermined section.

The invention claimed is:

1. A method for uniform heating of an end portion of a pipe made of thermoplastic material, comprising the following steps:
   providing an external heating element for heating an outer surface of an end portion of the pipe,
   providing an internal heating element including an infra-red ray radiation unit, for heating an inner surface of the end portion of the pipe,
   partially screening infra-red rays emitted by the infra-red ray radiation unit in an intermediate position of the infra-red ray radiation unit, along a longitudinal direction of extension parallel to a central axis of the pipe, using a first screening element having an annular extension about the infra-red ray radiation unit,
   inserting the infra-red ray radiation unit and the first screening element at least partially into an interior of the end portion of the pipe such that the first screening element is positioned in the interior of the pipe, radially between the infra-red ray radiation unit and the pipe;
   adjusting the intermediate position of the first screening element relative to the infra-red ray radiation unit in the longitudinal direction depending on a configuration of the pipe.

* * * * *